United States Patent [19]

Lindemeier et al.

[11] Patent Number: 5,335,010
[45] Date of Patent: Aug. 2, 1994

[54] ANTENNA DIVERSITY RECEIVING SYSTEM WITH ANTENNA SWITCHING DURING LINE PERIODS AND SIGNAL QUALITY EVALUATION DURING LINE BLANKING INTERVALS

[75] Inventors: Heinz Lindemeier, Planegg; Jochen Hope, Haar; Leopold Reiter, Gilching; Rainer Kronberger, Ottobrun, all of Fed. Rep. of Germany

[73] Assignee: U.S. Philips Corporation, New York, N.Y.

[21] Appl. No.: 930,697

[22] PCT Filed: Feb. 8, 1991

[86] PCT No.: PCT/NL91/00020

§ 371 Date: Dec. 17, 1992

§ 102(e) Date: Dec. 17, 1992

[87] PCT Pub. No.: WO92/14310

PCT Pub. Date: Aug. 20, 1992

[51] Int. Cl.$^5$ ............................................. H04N 5/44
[52] U.S. Cl. ................................... 348/706; 343/876; 455/277.1; 455/277.2; 348/725
[58] Field of Search ................................ 358/188, 181; 455/277.1, 277.2; 343/876; 348/725; H04N 5/44, 5/268

[56] References Cited

U.S. PATENT DOCUMENTS

| | | | |
|---|---|---|---|
| 4,101,836 | 7/1978 | Craig et al. | 455/277.1 X |
| 4,170,759 | 10/1979 | Stimple et al. | 343/876 X |
| 4,317,229 | 2/1982 | Craig et al. | 455/277.1 |
| 4,433,344 | 2/1984 | Gradin et al. | 358/181 |
| 4,723,127 | 2/1988 | Ohe et al. | 343/876 X |
| 5,204,979 | 4/1993 | Schenkyr et al. | 455/277.2 X |
| 5,239,541 | 8/1993 | Murai | 455/277.2 X |

FOREIGN PATENT DOCUMENTS

| | | | |
|---|---|---|---|
| 3926336 | 2/1991 | Fed. Rep. of Germany | H04N 5/44 |
| 61-5683 | 1/1986 | Japan | H04N 5/44 |
| 0127881 | 5/1990 | Japan | H04N 5/44 |
| 0141180 | 5/1990 | Japan | H04N 5/44 |

Primary Examiner—Mark R. Powell
Assistant Examiner—John W. Miller
Attorney, Agent, or Firm—Robert J. Kraus

[57] ABSTRACT

Antenna diversity receiving system for mobile reception of television signals having N antenna inputs, one diversity processor with as many inputs, and connected downstream in the system to a television receiver, the video signal of the television receiver and the line and picture synchronizing signals being applied to the diversity processor. The diversity processor comprises a time gate circuit which is opened by the line synchronizing pulses during the line blanking interval and switches the video signal through to the signal quality evaluation circuit. At that location an output signal having the signal quality of the video signal is produced which is applied to the control circuit. In the case of an imminent picture disturbance the control circuit produces an address signal so that very rapidly a new antenna signal or a linear combination derived from the antenna signals is applied to the television receiver by means of the antenna combiner. Particularly advantageous is the fact that during the line blanking interval the signal quality of all available HF signals is tested and the one HF signal having the best signal quality is switched through to the television receiver during the remaining time interval.

20 Claims, 4 Drawing Sheets

ANTENNA DIVERSITY RECEIVING SYSTEM WITH ANTENNA SWITCHING DURING LINE PERIODS AND SIGNAL QUALITY EVALUATION DURING LINE BLANKING INTERVALS

BACKGROUND OF THE INVENTION

The invention relates to an antenna diversity receiving system for mobile reception of television signals as stated in the introductory part of claim 1.

Such antenna diversity receiving systems are preferably used to improve television reception in private motor cars.

At the 37th IEEE Vehicular Technology Conference, Tampa, Fla. Jun. 1-3, 1987, an antenna diversity receiving system was proposed. In this system 4 antenna signals are applied to a switching unit. In a comparator inserted before the television receiver, the antenna signals are compared with each other during the field blanking interval and, by means of switching diodes for avoiding picture flutter, the better antenna signal is switched to during the field blanking interval.

However, because the evaluation of the antenna signal level and the switching-over to the picture synchronization is included, a relatively slowly operating diversity system is provided which is capable of presenting a better antenna signal to the television receiver in the best case within a 20 ms time interval. With a receiving frequency of, for example, 800 MHz, already at a vehicle speed of 10 km/h a stretch of road corresponding to about 1.5 times the wavelength is covered during these 20 ms. When such antenna diversity receiving systems are used in motor cars it is very much a matter of the dynamic behaviour of the diversity system, because on the basis of the movements of the vehicle the antenna voltages change continuously and all the more so the shorter the wavelength of the signals to be received is. Therefore, it is necessary to verify the signal quality at very brief time intervals.

Additionally, the following further aspects are to be considered.

Since the electromagnetic waves are superimposed, it may also happen that even in a stationary vehicle no television reception is possible when at the receiving point the waves incident on the receiving antenna from various directions are accidentally cancelled.

The superpositioning of electromagnetic waves with large separate delays may also lead to the fact that on the television screen (monitor) so-called ghost images become visible which affect reception.

As a result of the television signal channel bandwidth which is large compared with that of radio, frequency-selective fading may additionally occur so that, for example, the chrominance subcarrier is cancelled and only a black-and-white picture is received instead of a colour picture transmitted by the transmitter.

As a result of the movement of the vehicle and the directivity of the reception this may further lead to intermodulation interference and adjacent channel interference.

SUMMARY OF THE INVENTION

Common channel interference caused by overshoot also considerably reduces the picture quality in many cases.

Therefore, it is an object of the present invention to provide an antenna diversity receiving system, which avoids picture disturbance both in the stationary vehicle and in slowly and fast moving vehicles, in that always rapidly and precisely the best signal is selected from presented antenna signals.

This object is achieved in a system according to the invention by means of the characterizing features claimed in claim 1.

The advantages envisaged with this invention consist of the suppression of picture disturbance in the stationary, the slowly moving and also in the fast moving vehicle. For example, the known and frequently occurring picture disturbance such as amplitude fading which leads back to multipath reception with short delay differences, and the consequent loss of synchronization of the picture, both as regards line and picture synchronization, which manifests itself by means of picture flutter, is avoided. Colour disturbances of the picture that may lead to the complete loss of the colour information, as well as picture disturbance due to multipath reception with large delay differences, which cause ghost images, adjacent channel interference and intermodulation interference due to the reception of large undesired signals, are largely avoided when this invention is implemented. In response to the signal quality evaluation during the line blanking interval an picture disturbance can be detected in less than 12 ms, so that the diversity processor is capable of detecting an undisturbed HF signal from a range of HF signals within a very short period of time. The antenna diversity system according to the invention furthermore has the advantage that for the detection of picture disturbance the diversity processor is to receive only signals that are already available in the television receiver anyhow, and that no additional signals, for example, for horizontal or vertical picture stabilization are to be applied from the diversity processor to the television receiver.

BRIEF DESCRIPTION OF THE DRAWING

Exemplary embodiments of the invention will now be further explained with reference to the following Figures, in which.

DESCRIPTION OF THE PREFERRED EMBODIMENTS

Figure 1:
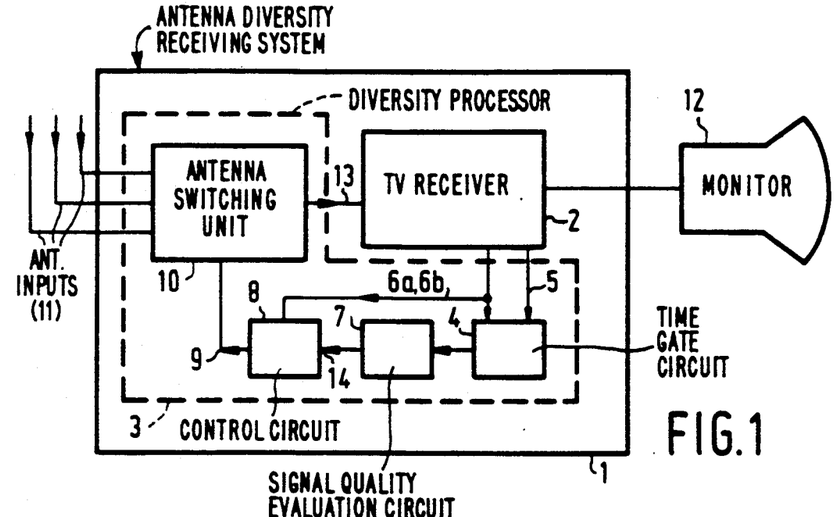
FIG. 1 shows an antenna diversity system with N antennas, the diversity processor 3 and the television receiver 2.

FIG. 1 shows an antenna diversity receiving system 1 with N antenna inputs 11, comprising a diversity processor 3 with as many inputs, and including a television receiver 2 arranged downstream in the circuit, the video signal 5 of the television receiver and the synchronizing signals 6 which trigger a monitor 12 being applied to the diversity processor. The line synchronizing signals 6a have a prior art control time constant of the order of several ms, so that especially the line oscillator will not change its frequency for several lines as a result of a briefly disturbed video signal. The diversity processor 3 comprises a time gate circuit 4 which is opened by means of a trigger signal derived from the line synchronizing pulses (6a) and, under the influence of appropriate circuits, remains open as long as the standardized line signal takes. This means that the time gate circuit is open during the standardized line blanking interval 26 (FIG. 3) and passes the video signal 5 to the signal quality evaluation circuit 7. In the signal quality evaluation circuit 7 an output signal 14 corresponding to the video signal quality is generated, which output signal is applied to the control circuit 8 included in the diversity processor 3. The synchronizing signals 6 which trigger the monitor are also applied to the control circuit 8. Consequently, in response to the output signal of the quality evaluation circuit, the control circuit can produce an address signal 9 so that the high-speed antenna switching unit 10 is readjusted very fast during the line period and a better high-frequency signal 13, which is an antenna signal 11 itself or a linear combination derived from a plurality of antenna signals, is applied to the television receiver.

Figure 2:
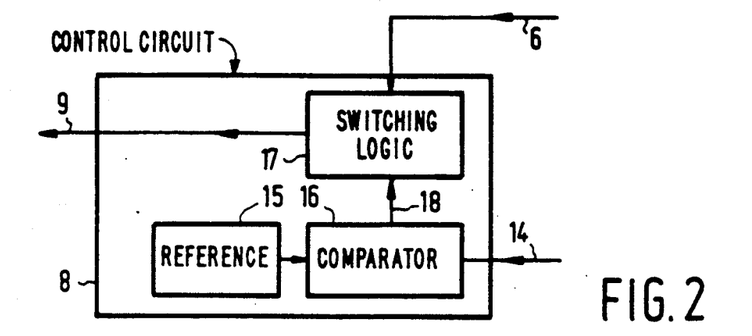
FIG. 2 shows a control circuit 8 comprising the switching logic 17, the reference 15 and the comparator 16.

A particularly simple embodiment of the invention lies in the fact that a reference signal 15 is available as a fixed threshold in the control circuit 8, as is represented in FIG. 2. If, during a specific period of time, a high-frequency signal is applied to the television receiver, the signal quality of the video signal will be established line-by-line by the signal evaluation circuit via the time gate circuit, and the output signal 14 will correspond to the video signal quality. If this output signal lies beyond the threshold predetermined by the reference signal, this HF signal continues to be applied to the television receiver. In response to the constantly changing receive threshold in the moving vehicle, caused by the Rayleigh distribution of the received field strengths, signal fading may occur which could manifest itself in picture disturbance. However, the signal quality evaluation circuit recognizes within a maximum of 12 μs the imminent disturbance because the output signal 14 slips under the threshold of the reference signal. The comparator 16 included in the control circuit 8 then produces a switch signal 18. This binary switch signal causes the switch logic 17 to generate a new address signal 9 which is applied to the antenna switching unit 10 after which a new high-frequency signal 13 is applied to the television receiver and the imminent picture disturbance is prevented.

It is particularly favourable when still in the same line blanking interval 26 or in the next line blanking interval the new high-frequency signal is switched to, since then the switching process is performed in the invisible range of the line and, consequently, picture disturbance that could be caused by the switching process remains invisible. In order to exclude impairment of the colour, switching operations should not take place during the colour burst, if possible.

On the basis of the disturbance-detection time which, according to the invention, may be very brief, many signal combinations that can be derived from the antenna signals 11 can be tested in a short period of time because, as has been stated hereinbefore, the line oscillator does not change its frequency for a specific period of time even when the video signal changes. In this manner it is guaranteed that such a signal is selected any moment when there is at least one undisturbed combination signal.

Figure 4:
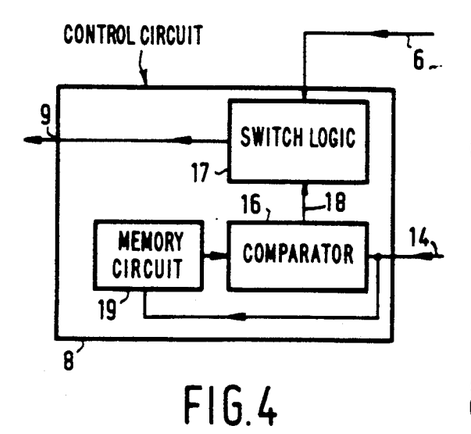
FIG. 4 shows a production of the reference value by means of a memory circuit 19.

A disadvantage of the fixed threshold is that the diversity receiving system cannot be accommodated to radically changed receive situations. This may lead to the fact that, for example, in service areas having a poor signal supply switching has to be effected too frequently and additional disturbances are produced thereby. In these cases it is more advantageous for the reference signal 15 to represent the mean signal quality in the receiving situation concerned. This can be realised by means of the embodiment shown in FIG. 4. In this embodiment the video signal quality obtained in various HF signals, for example, for a specific duration of a ride, is continuously written into a memory circuit 19, so that after a specific period of time a signal appears that corresponds to the mean signal quality in this service area and adapts itself to this situation by means of a suitably selected time constant. If the current signal quality determined at the end of a line falls short of the mean signal quality, again a switch signal is produced by the comparator and a new high-frequency signal is applied to the television receiver by means of the switching logic via the antenna switching unit.

Figure 3:
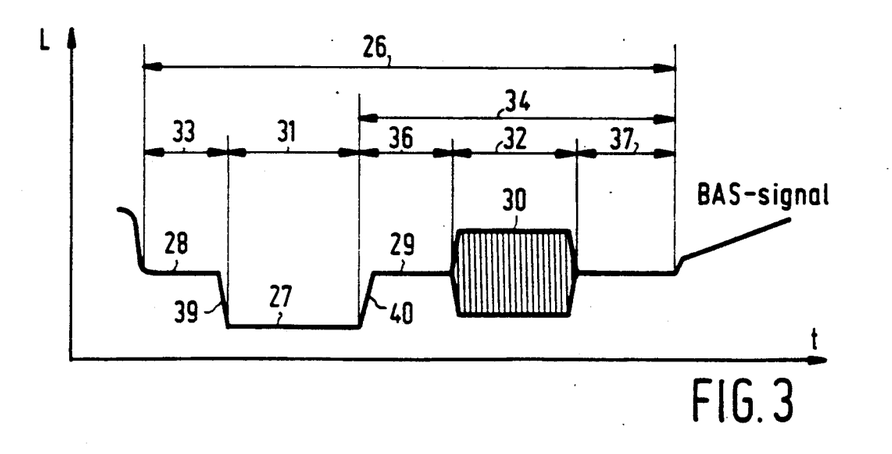
FIG. 3 shows a line synchronizing signal of the BAS signal with the characterizing features of the gate opening times and the signal quality criterions.

FIG. 3 shows in a diagram the standardized BAS signal according to the B, Y, R PAL standard. The line blanking interval 26 comprises the complete process of line synchronization and forms part of the line period. The line period is continued in a modified form in the picture synchronizing signal 6b. The BAS signal contains the front porch 28, the synchronizing value 27, the back porch 29 and the colour burst 30. Appropriate signal quality criteria can be assigned to these signal portions. For example, although a colour signal is radiated by the transmitter, an unavailable colour burst 30 represents a quality criterion that can be evaluated in a manner known per se by means of an appropriate circuit. Likewise, the front porch, the back porch and the synchronizing value are measures for the signal quality, because the HF signal level can be determined by appropriate circuits using these measures. According to the state of the art the front and back porches and the synchronizing value are used in the "scanned" control circuit for keeping the black level constant, so that the contrast remains the same when HF signal level changes occur. This control circuit has a time constant passing through various pictures. Since the synchronizing value and the front and back porches are direct measurements for the relative HF signal level, it will be possible to detect a level change of the HF signal by way of the synchronizing value and the front and back porches if this change takes place substantially faster than according to the time constant of the "scanned" control circuit.

Furthermore, disturbing noise is superimposed on the scanning signal if there is a very low HF signal level. This disturbing noise in the form of small amplitude oscillations shown in a so-called "snowy" picture, may also be ascertained according to the state of the art by means of appropriate circuits.

If, as a consequence of detour signals having delays in the μs range, so-called ghost images (echoes) are produced, signal disturbances are detected in the line blanking interval which manifest themselves in that various blanking signals shifted in time by the delay of the echo waves are contained in the blanking signal to be evaluated. These large signal disturbance amplitudes representing the echoes can be detected by means of suitable comparator circuits in a manner known per se as is also effected, for example, in commercial television test receivers in which the blanking interval is blended into the picture by means of appropriate circuits and the echoes are visualized by means of a beam intensity modulation.

Figure 9:
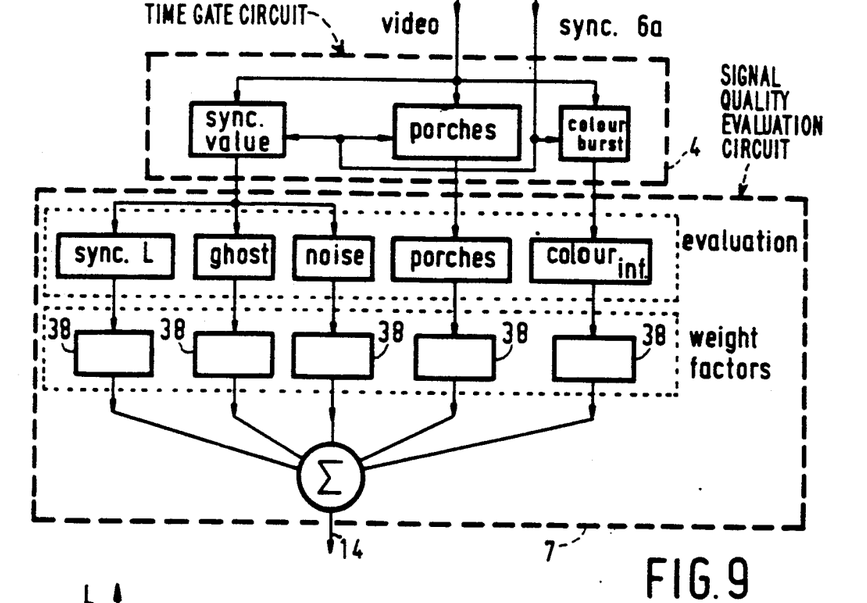
FIG. 9 shows a time gate circuit 4 having the various gate opening times and the assigned signal quality criterions in the signal quality evaluation circuit 7.

A particularly advantageous compromise between cost and efficiency is achieved when the HF signal level, the existence of echoes and the colour bursts are evaluated. Individual weight factors 38 (FIG. 9) can be applied to these three signal quality criteria, so that a specific order in the importance of the signal quality criterions in the output signal 14 is obtained. For example, based on practical experience, the greatest importance is habitually attributed to the HF signal level. The loss of colour has the greatest importance but one, because it occurs subjectively in a more disturbing manner than echoes do. This order of the signal quality criterions in the output signal can be taken into account by means of prior-art circuits.

The mean signal quality criterions may also be suitably determined over a plurality of lines. This is to be recommended particularly when, for example, the disturbing noise superimposed on the video signal is to be evaluated. However, since the picture disturbance detection circuit operates more slowly due to this measure, it is more advantageous in practice to apply this type of disturbance detection only in addition to the other criterions.

In order that the signal quality criterions can be evaluated in the signal quality evaluation circuit 7, the time gate circuit 4 (FIG. 1) is to be suitably arranged. This may be effected in that the opening edge 39 (FIG. 3) of the line synchronizing signal 6a triggers the monitor, triggers a retriggerable monoflop whose pulse interval exactly corresponds to the standardized line blanking interval 26, so that the line synchronizing signal of the video signal, as it is standardized for the undisturbed picture signal, is switched through to the signal quality evaluation circuit. In this context it should be considered that the line synchronizing pulse applied to the time gate circuit may be shifted in time relative to the video signal so that, by means of further circuitry, the instant at which the gate is opened again corresponds to the beginning of the blanking interval in the standardized video signal.

In order to evaluate the various signal quality criterions at the proper instant, it is advantageous to use a plurality of gate circuits (FIG. 9) when the invention is implemented. A gate opening time can be determined in such a way that the gate is opened immediately after the edge 39, after which the video signal has the synchronizing value and the gate is closed again immediately before the edge 40, after which the video signal again reaches the blanking value. In this manner the existence of echoes can be established in a particularly advantageous manner by means of simple comparator circuits in the signal quality evaluation circuit, because in situations like these a time shift of the BAS signals is effected in response to the echo waves.

In addition, within this gate interval the disturbing noise superimposed on the video signal can be determined extremely advantageously in the signal quality evaluation circuit because a uniform signal will be available if there is no disturbance, so that also here the disturbing noise can be established by means of comparator circuits. The HF signal level is expressed as a blanking value in addition to the synchronizing value because the blanking value and the synchronizing value according to the standard bear a fixed proportion to each other.

If a gate opening time for the front porch 28 is aimed at, this gate can be opened and the time interval of the opening be adapted to the duration of the standardized time interval of the front porch by means of the suitably adjusted edge of the line synchronizing signal of this gate circuit. A similar mode of operation is shown for the back porch 29. However, it should be considered in this context that in colour pictures the duration of the colour burst is to be left blank, so that then the gate opening time for the back porch is divided into two sections 36 and 37 (FIG. 3).

The evaluation of the colour in the signal quality evaluation circuit is effected for the duration of the colour burst. The edge 39 of the line synchronizing pulse sets, for example, a retriggerable monoflop for the duration till the beginning of the colour burst when there is no picture disturbance. As a result, a further retriggerable monoflop is set so that its pulse duration corresponds to the opening time of the gate 32 of the colour burst when there is no picture disturbance. By means of simple circuits in the signal quality evaluation circuit it can now be established whether or not a colour signal is present. If, for example, a black and white film is transmitted, there will not be any colour signal. In order not to disturb the evaluation of the signals, the presence of the colour burst can be monitored over a rather long period of time and automatically a small weight factor 38 can be applied to this criterion so that the colour will then be discarded when the best HF signal is selected.

The antenna switching unit 10 (FIG. 5) has for its purpose to switch one or a combination of signals out of the N supplied antenna signals 11 to the television receiver 2. In the simplest case the antenna switching unit switches one of the N antenna signals 11 through, for example, by means of electronic switches.

In many cases the number of antennas 11 used on a vehicle is low. In this case it is suitable to select the number of selector inputs 22 to be larger than the number of antenna inputs. Therefore, in a further embodiment of the invention the antenna switching unit 10 comprises an antenna combiner 21 that combines the N antenna signals 11 to M linear combinations 22 of these signals. In this context it is essential that the selector input signals 22 formed by linear combinations of the antenna signals 11 be as independent of each other as possible from a statistical point of view.

Figure 6:
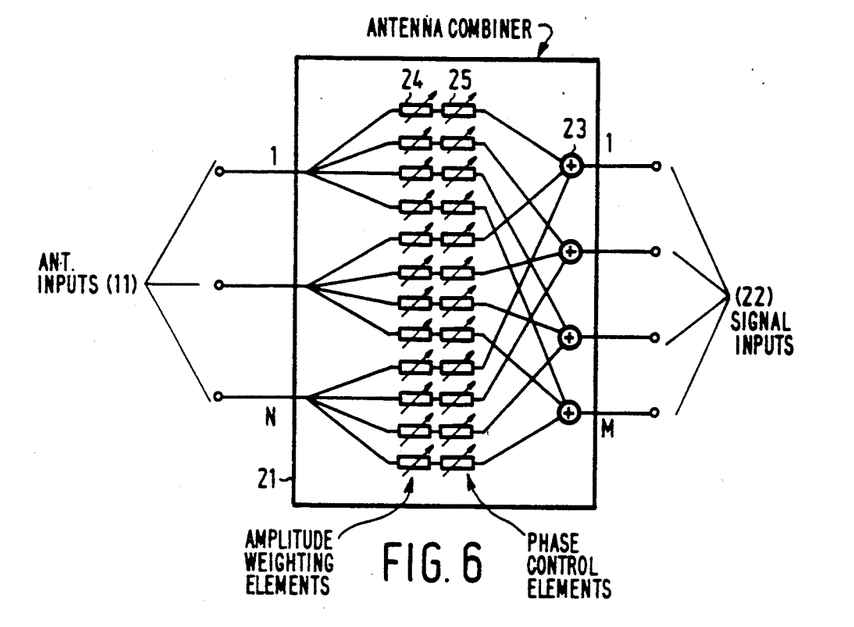
FIG. 6 shows the antenna combiner 21 with the phase control elements 25 and the amplitude weighting elements 24 and M nodes.

Linear combinations are formed in that the amplitude of each of the antenna signals 11, without any retroactive effect on the other antenna signals 11, is weighted by means of amplitude weighting elements 25 and the phase is shifted by means of phase shifters 24 and these signals are combined at nodes 23 as shown in FIG. 6. The weighting elements 25 and the phase shifters 24 can be adjusted by the control circuit 8 by means of the binary address signal 9. In order to make a distinction as to whether the address signal is to trigger the signal selector or the antenna combiner, the control circuit can generate a codeword and add same to the address signal. When it is assumed that an appropriate decoding takes place in the signal selector and in the antenna combiner, an unambiguous allocation is provided.

Figure 7:
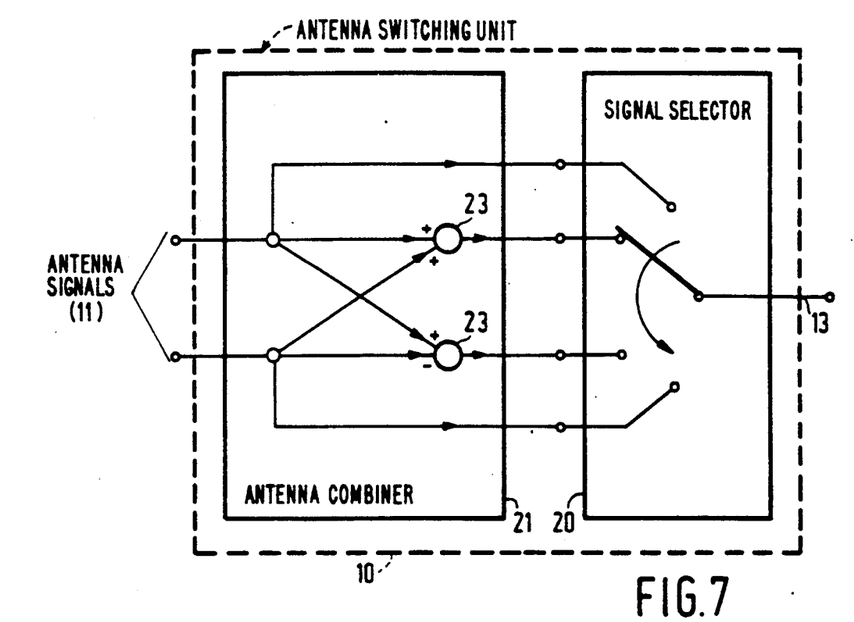
FIG. 7 is a basic circuit diagram for the additional formation of the sum and differential signals from N=2 antenna signals 11 and the feeding of the antenna signals themselves to the signal selector 20.

Of particular advantage is the formation of four signal inputs 22 at the signal selector 20, whose signals are formed by two antenna input signals 11. This takes place, as represented in FIG. 7, by summing and differentiating between the two antenna input signals 11 and individually passing the antenna input signals 11 to two further signal inputs 22 in the signal selector 20. Thus, $M=4$ signal selector inputs 22 which have input signals largely independent of each other can be formed from each $N=2$ antenna input signals.

Figure 8:
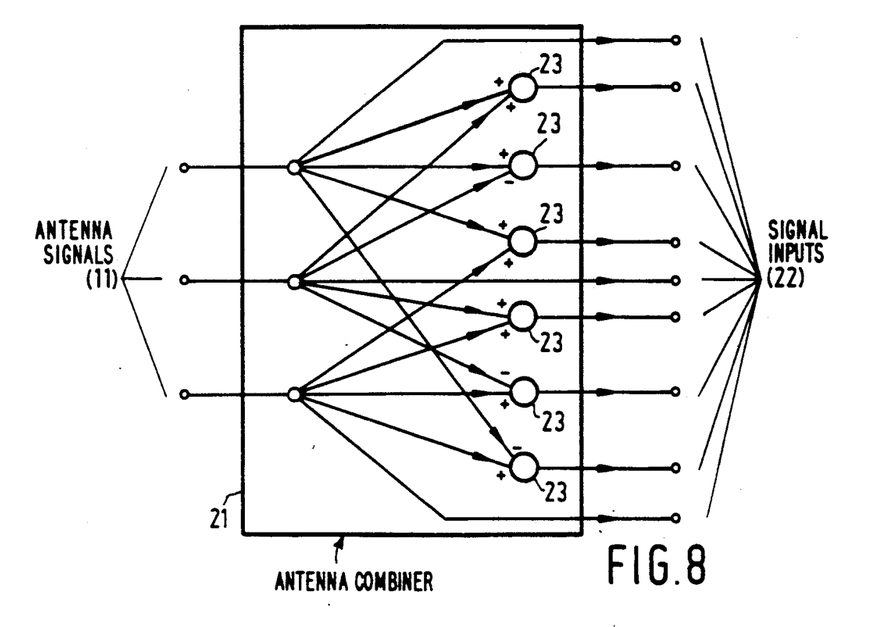
FIG. 8 shows a basic circuit diagram for the formation of M=9 signal inputs 22 for the signal selector from N=3 antenna signals 11 by the use of the sum and differential signals of pairs of antenna signals.

FIG. 8 shows an exemplary implementation of this principle with $N=3$ antenna input signals 11, from which $M=9$ signal selector inputs are formed.

Practical receiving attempts have proved that the increase of the number of signal inputs 22 with a predetermined number of antennas causes an essential improvement of the reception by means of the antenna diversity system, although this improvement is more confined than when an accordingly larger number of additional antennas 11 is used.

The signal selector 20 is in most cases an addressable switch which connects, when triggered by an address signal 9, a signal input 22 to the output 13. Particularly advantageous is a binary formation of the address signal 9 in view of the decoding simplicity.

Figure 5:
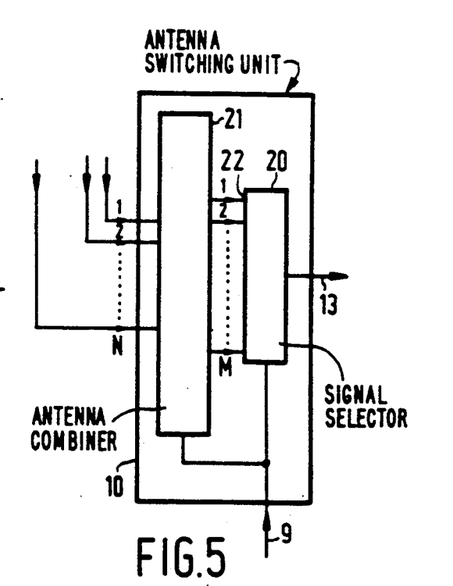
FIG. 5 shows an antenna switching unit 10 comprising the antenna combiner 21 and the signal selector 20.

When a binary switching signal 18 (FIG. 2) from the comparator 16 occurs, the switching logic 17 will produce an address signal 9 to be transferred to the signal selector 20 so that a specific signal input 22 is connected to the input of the television receiver. In a further particularly advantageous embodiment of the invention the signal inputs 22 in the signal selector 20 as shown in FIG. 5 are connected in accordance with a specific list of priorities to the input of the television receiver 2 in the case of picture disturbance. In accordance with this priority list a list of address signals 9 is stored in the switching logic 17. Such a priority list can be compiled on the basis of preceding receive measurements in the vehicle and the efficiency of the various linear combinations of the antenna signals 11 and implemented in the control circuit 8. In a particularly simple embodiment of the invention the signal inputs 22 are seized with equal priority and the signal inputs 22 are cyclically connected to the television receiver 2 in the case of imminent picture disturbance.

In a further embodiment of the invention the antenna combiner 21 has N antenna inputs 11 and $M=N$ signal outputs 22, which in turn represent the signal inputs of the signal selector 20. Each antenna input 11 is connected to a signal input 22 of the signal selector 20 through an amplitude weighting element 25. These amplitude weighting elements 25 are arranged such that the mean values of the received signals at the selector inputs 22 are equally large. If antennas comprising amplifiers are used, the amplitude weighting elements 25 are adjusted such that the signal-to-noise ratios at the selector inputs 22 are substantially equal. This ensures that the mean signal quality at all the selector inputs 22 is equal and thus that each selector input 22 is equally likely used for the receiving operation. If the efficiency of the antennas 11 is approximately the same, these amplitude weighting elements 25 can be arranged as simple switching circuits.

The control circuit 8 which causes a switching operation to be performed in the signal selector 20 can be arranged in different manners according to the invention. For example, there is a possibility of commencing the switching operation in the signal selector when there is an imminent picture disturbance or of searching for the HF signal which immediately enables the best television reception without any disturbance of the picture.

When the concept according to the invention is implemented, for example, at the beginning of a field the M signal inputs of the antenna selector 20 are cyclically switched open for one line each at the beginning of the line blanking interval 26. During the line blanking interval the signal quality of each of the M signals is retained in an associated memory 19 in the signal quality evaluation circuit 7. During the next line the M memory contents are compared with each other in the comparator 16. In this manner the signal that has the highest signal quality is determined. In the next line blanking interval 26 the switching logic 17 then switches this HF signal through the antenna switching unit 10 to the television receiver 2 for the remaining time period of the field. This procedure is particularly favourable because according to the state of the art the initial lines of the field are not visible on the monitor 12. According to the B,Y,R-PAL standard the picture appearing on the monitor does not begin until the line number 22 or 336 respectively, so that at least $M=16$ signals can be tested because the first 6 lines are reserved for the picture synchronization. However, if more than 16 signals are available, a total of at least 32 signals can be tested on signal quality when the evaluation circuit is used at the beginning of the second field and the best signal can be selected from these signals.

This method considerably improves reception because a disturbance of a field is less likely since the best of the M signals is used. However, if nevertheless disturbances do occur during this time interval, they will not be cancelled. If this method were also used in the visible range of the field, picture disturbance would occur if a poor-quality HF signal were switched through for the duration of one line for a signal quality test.

Therefore, it is better to have the search process for the best HF signal organised such that during the normal course of the picture the evaluation of the signal quality of the M signals 22 is effected over the whole field in the line blanking interval 26 and from these signals each time for the duration of a line, in which the picture content is represented on the monitor, the HF signal having the best signal quality and thus the least picture disturbance is switched to the television receiver.

The search for the best HF signal is controlled by the switch algorithm implemented in the switching logic 17. The switching logic connects the signal input to be tested of the signal selector 20 to the television receiver by generating an address signal 9. The switching algorithm may be realised according to a fixed pattern, for example, cyclically. A switching operation may also be performed according to the principle of chance.

Figure 10:
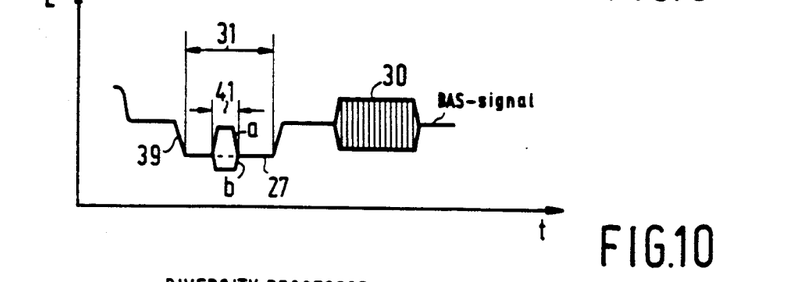
FIG. 10 shows the synchronizing signal when switching takes place in the interval 31, while the second HF signal has a lower HF level (a) or has a larger HF level (b)

A particularly advantageous use of the innovative idea consists in that the signal quality of 2 HF signals is tested during a line blanking interval 26. In the procedure to be described hereinafter the most important signal quality criterion is used according to which the HF levels of two HF signals are compared with each other during the time interval 31 (cf. FIG. 9 and FIG. 10). For this purpose the switching logic 17 produces a new address signal so that shortly after the edge 39 a new HF signal is applied to the television receiver via the antenna switching unit 10. The test interval of this HF signal is shorter than the duration 31 of the synchronizing value. The order of this switching operation is that the video signal has a time behaviour as represented in FIG. 10. If the new HF signal level is lower than the previous one, the synchronizing value 27 will be higher (case a), but if the synchronizing value of the new signal is lower than the previous synchronizing value (case b), the new signal will have a higher HF signal level. This is caused by the fact that during the short test interval 41 the "scanned" control is not activated and thus the HF signal level is directly proportional to the synchronizing value.

If in the signal quality evaluation circuit 7 the two synchronizing signals are scanned and compared to each other in the comparator 16, the switching logic 17 will be capable of selecting the better of the two signals by means of the binary switch signal 18 and, at the end of the time interval 31 of the synchronizing value, capable of applying the better signal to the television receiver 2 over the antenna switching unit 10. This is advantageous in that at the beginning of the next line already the better of the two signals has been switched through. In this manner all M signals of the signal selector can be tested one after the other in the line blanking interval, while the better signals can be established on the basis of the comparison result within a very short period of time. In the moving vehicle it is thus achieved that this search operation always establishes the best signal during the line blanking interval.

For realising the signal selector 20 one should consider that the transients in the video signal, caused by the switching operation in the signal selector, are kept smallest possible by means of appropriate measures, for example, filtering. If one succeeds in minimizing these transients during the switching operation, more than 2 signals, for example, 3 or 4 signals, can be evaluated relative to each other during the time interval 31 as regards the synchronizing value of the HF signal. This entails that high-speed logic modules are to be used in the switching logic 17 so that already the signal having the highest HF level is switched at the end of the time interval 31 of the synchronizing value for the next line because this switching operation is not to be performed during the time interval of the colour burst because then a colour disturbance may occur.

This substantial expenditure can be reduced in that the switching operation to the signal having the higher HF level is no longer performed during the same time interval 31 of the synchronizing signal, but in the next line blanking interval. Furthermore, the evaluation of the signal comparison may also be effected during the line. This method leads to the fact that in that case a signal test has to be made every second blanking interval. The resultant degradation of the picture quality is negligibly small.

Figure 11:
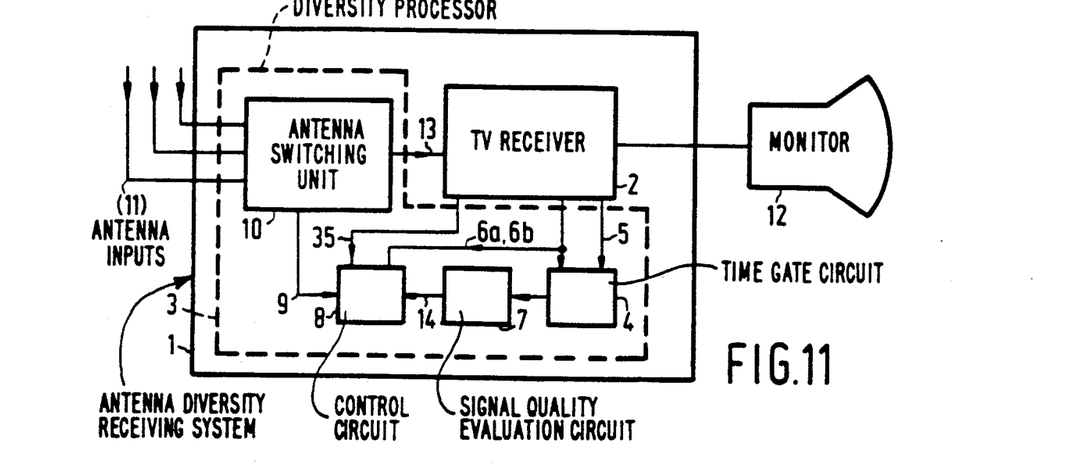
FIG. 11 shows an antenna-diversity receiving system comprising a further connection 35 between the television receiver and the diversity processor 3.

If the synchronizing values of two HF signals that can be established during the switching operation have about the same value, in the most disadvantageous case there will be a constant switching back and forth between these two HF signals leading to the fact that picture distrubance may occur because the two signals do have the same HF level but have different phases. This effect is especially annoying in the stationary vehicle. Therefore, it is advantageous to give the comparator 16 a hysteretic effect so that a signal is selected in a defined manner. A particularly advantageous behaviour is found in practice when the hysteresis is controlled in response to amplitude by means of the mean HF signal level. This signal level is available, for example, in the form of the AGC (Automatic Gain Control) voltage 35 of the television tuner (see FIG. 11) or is derived from the sync values in the signal quality evaluation circuit 7 and applied to the comparator 16.

Television signals, especially those of the bands I or III, are insufficiently included by the HF signal level alone as regards the signal quality. Particularly ghost images (echoes) appear to an annoying extent. However, in order to include also the existence of ghost images, the whole time interval 31 of the synchronizing value will be required so that on the basis of the brief switching of the signal to be tested during the test interval 41 this cannot be considered because the test interval forms only a certain fraction of the time interval 31 of the synchronizing signal so that, consequently, echo waves can often not be included. Neither can an evaluation of the colour be performed in this test time interval since no colour burst is available at the instant of the switching operation.

Therefore, in a further embodiment of the innovative idea the sync values assigned to the two HF signals as a result of the switching operation are determined during a line blanking interval 26 and retained in the memories 19 assigned to the HF signals. In the next line blanking interval the previously switched HF signal is evaluated in the signal quality evaluation circuit 7 with respect to the existence of ghost images and colour information and this weighted output signal 14 is added to the assigned memory signal 19 so that now the memory contents corresponding to the signal quality of the two HF signals can be compared in the comparator 16 and, at the end of the next line during the time interval 31 of the sync value, the better of the two signals can be applied to the television receiver.

It is advantageous to effect the switching to the better HF signal not as late as at the end of the next line but already when the control circuit 8 prepares the new address for the signal selector 20 by means of the switch signal 18 of the comparator 16 over the switching logic. This may entail that the switching takes place in the time interval in which the line information (picture contents) is written on the monitor. However, since this HF signal exactly fits in the synchronizing (sync) fields, no picture disturbance is caused by the switching operation provided that the signal selector 20 itself does not cause any picture disturbance.

A further advantageous embodiment of the invention is characterized in that the echo and colour evaluation in the signal quality evaluation circuit 7 is not effected in the form of a weighting operation 38 (cf. FIG. 9) of the output signal 14, but in the form of binary signals which show the existence of echoes or colour fading and are applied to the control circuit 8. In the control circuit these binary signals can be further processed by means of logic combinations in tandem with a binary signal evaluation of the sync signals corresponding to the two HF signal levels resulting in that the control circuit with a switching algorithm and address encoding can be implemented in a microprocessor. This considerably reduces the cost of circuitry and manufacturing costs.

The switching algorithm implemented in the switching logic 17 continuosly searches during the occurrence of the picture for the HF signal that has the best receive quality. If the end of a picture is approached it is suitable, as shown by measurements, to stop the search operation several lines before the picture synchronizing pulse so that the process of the synchronization of the picture is not affected by the search. At the same time it is then achieved that at the picture frequency the best available signal is applied to the television tuner and thus losses of picture synchronization are found extremely rarely.

In order to trigger the antenna switching unit 10 the signal delay in the television receiver 2 is to be taken into account, so that the switching operations are performed at the desired points of time. If this signal delay in the television receiver is short, the switching logic 17 can be triggered immediately by means of the edge of the line synchronizing signal 39. If there is a large signal delay in the television receiver 2, the delay between the line blanking interval 26 and the switching operation is to be taken into consideration by means of an appropriate timing.

We claim:

1. A mobile antenna diversity receiving system for selectively coupling to a television receiver one of a plurality of antennas which are provided for receiving a HF television signal, said system including a diversity processor comprising:
   a. an antenna switching unit for selectively coupling the antennas to the television receiver;
   b. means for providing a video signal and a line synchronizing signal derived from the television signal being received by the antenna being coupled to the television receiver, said line synchronizing signal defining when line blanking intervals and line synchronizing pulses occur during successive line periods;
   c. a time gate circuit having an input for receiving the video signal and including means responsive to a trigger signal derived from the line synchronizing signal for providing said video signal at an output of said circuit during a line blanking interval;
   d. a signal quality evaluation circuit coupled to the output of the time gate circuit for producing a signal representative of the quality of the video signal provided at the output of said time gate circuit during the line blanking interval;
   e. a control circuit coupled to the signal quality evaluation circuit and to the antenna switching unit, said control circuit including a comparator for testing, during the line blanking interval, the quality of the received video signal, and said control circuit, in response to a predetermined result of said testing, effecting switching by said antenna switching unit, during a line period, to change the antenna selection.

2. Antenna diversity system as claim 1, characterized in that the control circuit (8) has a reference signal (15) and in that the output signal (14) of the signal quality evaluation circuit (7) is compared to this reference signal in the comparator (16) and, if compared to the reference signal, the signal quality is too low, a switching signal (18) is produced so that a switching logic (17) included in the control circuit (8) effects said switching by the antenna switching unit (10).

3. Antenna diversity system as claimed in claim 2, characterized in that the reference signal (15) in the control circuit (8) is produced by a memory circuit (19) in which the mean signal quality of the signal quality evaluation circuit (7) is determined over a predetermined period of time.

4. Antenna diversity system as claimed in claim 2, characterized in that the antenna switching unit (10) to which the address signal (9) is applied comprises a signal selector (20) having M signal inputs (22) and a high-frequency output (13) and the input signal corresponding to the address signal is switched to the high-frequency output, and an antenna combiner (21) having N antenna inputs and M signal outputs applies M signals to the signal selector (20).

5. Antenna diversity system as claimed in claim 4, characterized in that the antenna combiner (21) has up to M nodes (23) and each node (23) is connected to up to N antenna inputs (11) by means of a phase shifter (24) whose phase is suitably adjusted and by means of an amplitude weighting element (25) whose weight factor is suitably adjusted, and each node (23) is connected to one of the M signal inputs (22) of the signal selector (20).

6. Antenna diversity system as claimed in claim 5, characterized in that in the antenna combiner (21) signals applied to sets of two of N antenna inputs (11) are considered signal pairs and each of these antenna inputs (11) is connected to two different nodes (23) by means of two phase shifters and the phase shifters are arranged such that the antenna input signals are added together in-phase in one node (23) and added together in phase opposition in the other node, and each node (23) is connected to one of the M signal inputs (22) and two further signal inputs (22) of the M signal inputs are connected each direct to one of the two antenna inputs (11).

7. Antenna diversity system as claimed in claim 4, characterized in that the input signals (22) of the signal selector (20) are switched to the television receiver (2) at the beginning of each picture for one line each by means of the switching algorithm, in that the signal quality of each input signal is retained in a memory (19) assigned to the input signal and, during the next line period, the signal having the best signal quality is determined so that the next line period of this picture the HF signal having the best signal quality is switched to the television receiver (2).

8. Antenna diversity system as claimed in claim 7, characterized in that the mean signal quality of each input signal in the assigned memory (19) is determined over a plurality of pictures.

9. Antenna diversity system as claimed in claim 1, characterized in that the control circuit (8) operates by means of a switching algorithm implemented in the switching logic (17) so that during a line blanking interval (26) a different signal input (22) of the signal selector (20) is connected to the television receiver (2) for one or more lines for the purpose of signal quality evaluation and in that the signal quality of the previously connected HF signal is stored in the memory (19) and is compared to the signal quality of the currently connected HF signal in the comparator (16) and in that the better of the two signals is switched through via the switching logic (17) by means of the comparator output signal (18).

10. Antenna diversity system as claimed in claim 9, characterized in that the switching algorithm after each line or after each $n^{th}$ line produces an address signal (9) so that by means of the antenna switching unit (10) a different or various different HF signals are applied consecutively to the television receiver (2) for a test interval (41) which is shorter than the period (31) of the sync value, the sync values (27) assigned to the HF signals are scanned in the signal quality evaluation circuit (7) during the gate opening time for the synchronizing value (31), are stored in the assigned memory (19) and compared in the comparator (16) and, by means of the output signal (18) of the comparator, the HF signal having the best signal quality is switched to the television receiver (2) via the switching logic (17) and still within the interval (31) of the synchronizing signal.

11. Antenna diversity system as claimed in claim 10, characterized in that the switching algorithm switches first to the television receiver (2) at the beginning of an $n^{th}$ line first HF signal and cyclically applies another signal input of the signal selector (20) to the television receiver (2) at the end of the $n^{th}$ (or $n+3)^{th}$ line respectively, as a second HF signal for the duration of a test interval (41) and, during the gate opening time (31) for the sync value, the sync values assigned to the two HF signals are scanned in the signal evaluation circuit (7), are stored in the allocated memory (19) and, at the end of the $(n+1)^{th}$ line, the signal quality of the first HF signal is evaluated in the signal quality evaluation circuit (7) especially with regard to the presence of ghost images and colour information and this signal is added to the signal in the allocated memory, now the memory contents corresponding to the signal quality of the two HF signals are compared to each other in the comparator (16) and, at the end of the (n+2)th line, the one of the two HF signals that has the smallest picture disturbance is switched to the television receiver for the next two lines by means of the comparator output signal (18) via the switching logic (17) for the duration (31) of the synchronizing signal.

12. Antenna diversity system as claimed in claims 1, 2 or 3, characterized in that the signal quality in the signal quality evaluation circuit (7) is, based on the synchronizing value (27) of the video signal, on the colour burst (30), on the front porch (28), on the back porch (29), on the signal disturbance caused by so-called "ghost images" (echoes), and based on the noise disturbance superimposed on the sync value, and in that in the signal quality evaluation circuit (7) only a single criterion or a combination of criterions for the signal quality is evaluated.

13. Antenna diversity system as claimed in claim 12, characterized in that in the signal quality evaluation circuit (7) the various criterions for judging the signal quality are evaluated with weight factors (38) and the output signal (14) represents the signal quality.

14. Antenna diversity system as claimed in claim 12, characterized in that in the signal quality evaluation circuit (7) the criterion(s) for the signal quality is (are) averaged over a plurality of lines up to a maximum of the number of lines of a field.

15. Antenna diversity system as claimed in claim 1, 2 or 3, characterized in that the time gate circuit (4) is opened by the line synchronizing pulses (6a) so that the gate opening time corresponds to the line blanking interval (26) as is standardized for the undisturbed picture signal.

16. Antenna diversity system as claimed in claim 15, characterized in that in the signal quality evaluation circuit (7) the signal quality evaluation criterions are assigned to the gate opening times so that the synchronizing value (27) itself, the noise interference and the signal disturbance superimposed on the synchronizing value caused by so-called ghost images, is evaluated during the gate opening time for the synchronizing value (31), in that the colour burst is evaluated during the gate opening time for the colour burst (32), in that the front porch (28) is evaluated during the gate opening time for the front porch (33) and in that the back porch (29) is evaluated during the gate opening time for the back porch (34).

17. Antenna diversity system as claimed in claim 1, 2 or 3, characterized in that the control circuit effects cyclical coupling of the antennas to the television receiver.

18. Antenna diversity system as claimed in claims 1, 2, or 3, characterized in that a signal (35) approximately proportional to the mean HF signal level averaged over a plurality of pictures is applied to the control circuit (8) and in this manner a hysteretic effect is produced for the comparator (16) so that a signal is selected in a defined manner in about equal sync values of the HF signals to be compared.

19. Antenna diversity system as claimed in claim 1, 2, or 3, characterized in that no new switching is effected by the switching logic (17) for several lines before and after the picture synchronizing pulse (6b).

20. Antenna diversity system as claimed in claim 2 or 3, characterized in that an address signal (9) is applied from the switching logic (17) included in the control circuit (8) to the antenna switching unit and in accordance with this address signal (9) a linear combination of antenna signals (11) is available at the antenna switching unit output (13), and the address signal (9) applied to the antenna switching unit corresponds to the address to be selected and in that from this address signal an antenna signal itself or a linear combination derived from the antenna signals is applied to the television receiver (2).

* * * * *